United States Patent [19]

Neda

[11] Patent Number: 5,656,773
[45] Date of Patent: Aug. 12, 1997

[54] THERMAL MICRO FLOW SENSOR AND PRODUCTION METHOD THEREOF

[75] Inventor: Tokudai Neda, Tokyo, Japan

[73] Assignee: Tokyo Gas Co., Ltd., Tokyo, Japan

[21] Appl. No.: 513,151

[22] Filed: Aug. 9, 1995

[30] Foreign Application Priority Data

Aug. 12, 1994 [JP] Japan .................... 6-190319

[51] Int. Cl.$^6$ .................................................. G01F 1/68
[52] U.S. Cl. .................................................. 73/204.26
[58] Field of Search ...................................... 73/204.26

[56] References Cited

U.S. PATENT DOCUMENTS

| | | | |
|---|---|---|---|
| 4,009,482 | 2/1977 | Nakata | 357/28 |
| 4,293,373 | 10/1981 | Greenwood . | |
| 4,320,655 | 3/1982 | Kammermaier et al. . | |
| 4,343,768 | 8/1982 | Kimura . | |
| 4,377,944 | 3/1983 | Hishii et al. | 73/23 |
| 4,471,647 | 9/1984 | Jerman et al. . | |
| 4,624,137 | 11/1986 | Johnson et al. . | |
| 4,696,188 | 9/1987 | Higashi . | |
| 4,759,836 | 7/1988 | Hill et al. | 204/192.21 |
| 5,050,429 | 9/1991 | Nishimoto et al. | 73/204.26 |
| 5,148,707 | 9/1992 | Inada et al. | 73/204.26 |
| 5,388,457 | 2/1995 | Yasui | 73/204.26 |

FOREIGN PATENT DOCUMENTS

0076935  4/1983  European Pat. Off. .

*Primary Examiner*—Richard Chilcot
*Assistant Examiner*—Jewel V. Artis
*Attorney, Agent, or Firm*—Armstrong, Westerman, Hattori, McLeland, & Naughton

[57] ABSTRACT

A thermal micro flow sensor including a heating wire, said heating wire being made of a material having a resistivity in the range from $3.1 \times 10^{-7}$ $\Omega$m to $2 \times 10^{-2}$ $\Omega$m like polysilicon so that said heating wire has a resistance about 1 k$\Omega$, said heating wire being formed on a semiconductor material so that said heating wire has a thermal isolation structure for isolating said heating wire from said semiconductor substrate.

1 Claim, 5 Drawing Sheets

LEGEND

1) B.W. VAN OUDHEUSDEN, J.M. DE BRUIJIN, P.J. HOOGEBOOM, D. BEAUFORT AND J.H. HUIJING, "INTEGRATED SENSOR FOR NON-INVASIVE MONITORING OF FLOW IN PIPES", SENSORS AND ACTUATORS, VOL. 18, pp.259-267, 1989

2) D. MOSER, R. LENGGENHAGER AND H. BALTES, "SILICON GAS FLOW SENSORS USING INDUSTRIAL CMOS AND BIPOLAR IC TECHNOLOGY", SENSORS AND ACTUATORS, VOL. A25-27, pp.577-581, 1991

3) EUISIK YOON AND KENSALL D. WISE, "AN INTEGRATED MASS FLOW SENSOR WITH ON-CHIP CMOS INTERFACE CIRCUITRY", IEEE TRANS. ELECTRON DEVICES, VOL. 39, pp.1376-1386, JUNE 1992

Fig.7

THERMAL MICRO FLOW SENSOR AND PRODUCTION METHOD THEREOF

BACKGROUND OF THE INVENTION

1. Field of the Invention

The present invention relates to a flow sensor, and more particularly to a thermal micro flow sensor produced by means of semiconductor fabrication technology.

A micro flow sensor has an advantage that it has a very small size and thus it can be installed in a very small space, for example in the inside of a thin gas pipe so that the micro flow sensor detects a gas flow rate. Another advantage of the micro flow sensor is that it consumes very low electric power and therefore it can be employed for use in a flow meter that can operate with a battery power supply and thus it can be installed in an environment where a commercial AC power line is not available. Furthermore, the micro flow sensor can detect flow velocity over a very wide range from a few mm/s to a few ten m/s, and thus only a single micro flow sensor is required to detect flow velocity over such a wide range.

2. Description of the Prior Art

It is known in the art to fabricate a thermal micro flow sensor by forming a fine heating wire on a semiconductor substrate such as a silicon substrate using semiconductor fabrication technology including a fine patterning technique. It is also known to dispose a flow sensor of this type in the middle of a flow path of fluid so as to detect a flow rate on the principle that the heat transfer from the heating wire to the fluid changes depending on the flow rate of the fluid. Flow sensors of this type have advantages that they can be easily mass-produced, they have a small size, they consume very small electric power, and they can easily be connected to other electric circuits. Because of these advantages, flow sensor of this type, particularly in recent years, have become popular as means of detecting a flow rate or flow velocity.

In recent flow sensors of this type, a heating wire is formed in a bridge or cantilever beam shape on a semiconductor substrate so as to improve heat insulation between the heating wire and the semiconductor substrate thereby increasing the sensitivity of sensors and reducing thermal loss.

The heating wire on the semiconductor substrate can be made of various metal materials such as platinum, gold, copper, aluminum, chromium, tungsten, or permalloy (FeNi). An example of a thermal micro flow sensor of the above-described type is disclosed in Japanese Patent Laid-Open No. 3-52028 (1991).

In measuring operation, it is required that the sensor can provide an output signal greater than a required level with low noise. Furthermore, it is desirable that the sensor consume as low electric power as possible. For the above purpose, it is desirable that the current flowing through the heating wire be set to a value in the range from 0.5 mA to 10 mA and the voltage across the heating wire be set to a value in the range from 1 V to 10 V. Furthermore, it is desirable that the heating wire itself have a resistance in the range from 0.5 kΩ to 10 kΩ and more preferably the overall resistance be about 1 kΩ.

The power consumption of the thermal flow sensor is equal to the sum of the amount of heat $Q_1$ transferred from the heating wire to the fluid per unit time and the amount of heat $Q_2$ removed from the heating wire via the substrate. In the case where good thermal isolation is provided between the heating wire and the substrate, the power consumption is determined by $Q_1$ wherein $Q_1$ is proportional to the contact area S between the heating wire and the fluid. It has been concluded experimentally that the contact area S should be less than about 0.02 mm$^2$ to obtain small power consumption less than a few ten mW.

When the heating wire is made of metal having a resistivity smaller than $10^{-7}$ Ωm, it is required that the thickness of the heating wire should be less than about 0.1 μm to obtain a heating wire having a width greater than 5 μm and having a resistance of about 1 kΩ while maintaining the power consumption at a low level less than a few ten mw. However, a bridge or cantilever beam structure having such a thin thickness cannot have enough strength to be formed in a self-supporting fashion on a substrate unless there is provided a supporting structure for supporting the bridge or cantilever beam structure. However, the employment of the supporting structure will result in an increase in the volume of a part that makes no contribution to generation of heat, and thus will result in a reduction in heating efficiency of heating wire. As a result, the responsibility as well as the sensitivity of the sensor will be degraded. To obtain a high sensitivity, it is desirable that the heating wire have a high heating efficiency. However, the reduction in the thickness of the heating wire results in an increase in current density, which results in an increase in the probability of failure due to electro-migration or the like.

In the case where the heating wire is made of a thermistor material as disclosed in Japanese Patent Laid-Open No. 61-235725 (1986), the thickness of the heating wire should be greater than 2 μm to reduce the resistance to about 1 kΩ. However, this causes the thermal capacity of the heating wire to become too large and thus it is impossible to obtain good responsibility. Furthermore, when the sensor is mass-produced using a thermistor material, great variations occur in physical properties of the material, which causes a great reduction in production yield.

SUMMARY OF THE INVENTION

It is thus an object of the present invention to solve the problems described above. More specifically, it is an object of the present invention to provide a thermal micro flow sensor that can be mass-produced easily, and that is capable of detecting a flow velocity over a very wide range with excellent responsibility and with low power consumption.

Above objects are achieved by the present invention having various aspects as described below.

According to a primary aspect of the present invention, there is provided a thermal micro flow sensor including a heating wire, the heating wire being made of a material having a resistivity in the range from $3.1 \times 10^{-7}$ Ωm to $2 \times 10^{-2}$ Ωm so that the heating wire has a resistance about 1 kΩ, the heating wire being formed on a semiconductor material so that the heating wire has a thermal isolation structure for isolating the heating wire from the semiconductor substrate.

According to a second aspect of the present invention, there is provided a thermal micro flow sensor based on the above primary aspect wherein the thermal isolation structure includes a bridge structure or a cantilever beam structure.

According to a third aspect of the present invention, there is provided a thermal micro flow sensor based on the above primary aspect, wherein the material of the heating wire is polysilicon, and the heating wire is formed on the semiconductor substrate by means of semiconductor fabrication technology so that the heating wire has a line width in the range from 7 μm to 10 μm and a thickness in the range from 0.5 μm to 2 μm.

According to a fourth aspect of the present invention, there is provided a thermal micro flow sensor based on the above third aspect wherein the polysilicon is doped so that the heating wire has a required resistivity.

According to a fifth aspect of the present invention, there is provided a thermal micro flow sensor based on the fourth aspect wherein the heating wire is formed in such a manner that heating wire contact areas and lead wire areas connected to the heating wire contact areas have a resistivity lower than that of the other area of the heating wire.

According to a primary aspect of the production method of the present invention, there is provided a method of producing a thermal micro flow sensor, based on a semiconductor fabrication technology, the method comprising the steps of: forming a protective film on the entire area of the lower surface of a silicon substrate so that the protective film has a thickness in the range from 0.01 µm to 0.5 µm; forming a lower protective film, for protecting the lower surface of a heating wire, on the entire area of the upper surface of the silicon substrate by means of CVD, sputtering, or thermal oxidation so that the lower protective film has a thickness in the range from 0.1 µm to 2 µm; forming a polysilicon film to be used as the heating wire on the entire area of the upper surface of the lower protective film so that the polysilicon film has a thickness in the range from 0.5 µm to 2 µm, and further doping the polysilicon film so that the polysilicon film has a resistivity in the range from $3.1 \times 10^{-7}$ Ωm to $2 \times 10^{-2}$ Ωm; etching the polysilicon film so as to form a heating wire having a desired shape with a desired line width; forming an upper protective film by means of CVD or sputtering on the entire area of the top surface of the silicon substrate on which the heating wire has been formed so that the upper protective film has a thickness in the range from 0.1 µm to 1.5 µm, and further etching the upper protective film so that contact holes are formed in the upper protective film at locations corresponding to heating wire contact areas; forming an Au film by means of sputtering or evaporation on the entire area, including the contact holes, of the top surface of the silicon substrate so that the Au film has a thickness in the range from 0.1 µm to 1 µm, and further etching the Au film so as to form contact pads; dicing the silicon substrate from its upper surface so that a lower portion of the silicon substrate having a thickness of 50 µm to 200 µm remains without being diced; anisotropically etching a part of the silicon substrate under the heating wire so as to undercut the above-described part of the silicon substrate thereby forming a recessed portion having a depth in the range from 50 µm to 300 µm whereby the heating wire is thermally isolated from the silicon substrate.

According to a second aspect of the production method of the present invention, there is provided a method of producing a thermal micro flow sensor, based on the primary aspect of the production method, wherein said doping step includes the steps of performing ion implantation and further performing diffusion, or includes the steps of coating a dopant and further performing diffusion.

According to a third aspect of the production method of the present invention, there is provided a method of producing a thermal micro flow sensor, based on the second aspect of the production method, wherein the ion implantation is performed so that the doping level varies depending on the part of the heating wire.

According to a fourth aspect of the production method of the present invention, there is provided a method of producing a thermal micro flow sensor, based on the third aspect of the production method, wherein the ion implantation is performed in such a manner that the entire area of the polysilicon film is ion-implanted in a first ion implantation process, and then the heating wire contact areas and lead wire areas connected to the heating wire contact areas are ion-implanted in a second ion implantation process, or the ion implantation is performed in such a manner that the heating wire contact areas and lead wire areas connected to the heating wire contact areas are ion-implanted in a first ion implantation process, and then the entire area of the polysilicon film is ion-implanted in a second ion implantation process.

According to a fifth aspect of the production method of the present invention, there is provided a method of producing a thermal micro flow sensor, based on the primary aspect of the production method, the method further including the step of thinning the upper and lower protective films covering the heating wire to a thickness as thin as possible after the completion of the anisotropic etching process.

In the thermal micro flow sensor according to the present invention, a heating wire is produced using a material having a resistivity in the range from $3.1 \times 10^{-7}$ Ωm to $2 \times 10^{-2}$ Ωm so that the heating wire has a resistance about 1 kΩ by means of semiconductor fabrication technology. A part of the semiconductor substrate under the main part of the heating wire is removed by means of etching so that the heating wire has a self-supported thermal isolation structure in the form of a bridge or a cantilever beam thereby isolating the heating wire from the semiconductor substrate. Furthermore, the doping process is controlled so that the heating wire is doped in such a manner that each part of the heating wire has a different desired doping level. The heating wire is covered with an $SiO_2$ protective film for thermal and electric isolation and also for preventing the oxidation of the heating wire. Thus, the present invention provides a thermal micro flow sensor that can be mass-produced easily, and that is capable of detecting a flow velocity over a very wide range with excellent responsibility and with low power consumption which allows the sensor to operate with a battery power source.

BRIEF DESCRIPTION OF THE DRAWINGS

FIG. 1b is a cross-sectional view taken along line B—B of FIG. 1a;

FIG. 2 is a process flow for producing the embodiment shown in FIG. 1a;

FIG. 5 is a graph which shows flow sensing ability of the embodiment shown in FIG. 1a;

FIG. 6 is a graph which shows flow sensing ability of the embodiment shown in FIG. 1a.

DESCRIPTION OF THE PREFERRED EMBODIMENTS

Referring to the accompanying drawings, the present invention is descried in further detail below.

Figure 1A:
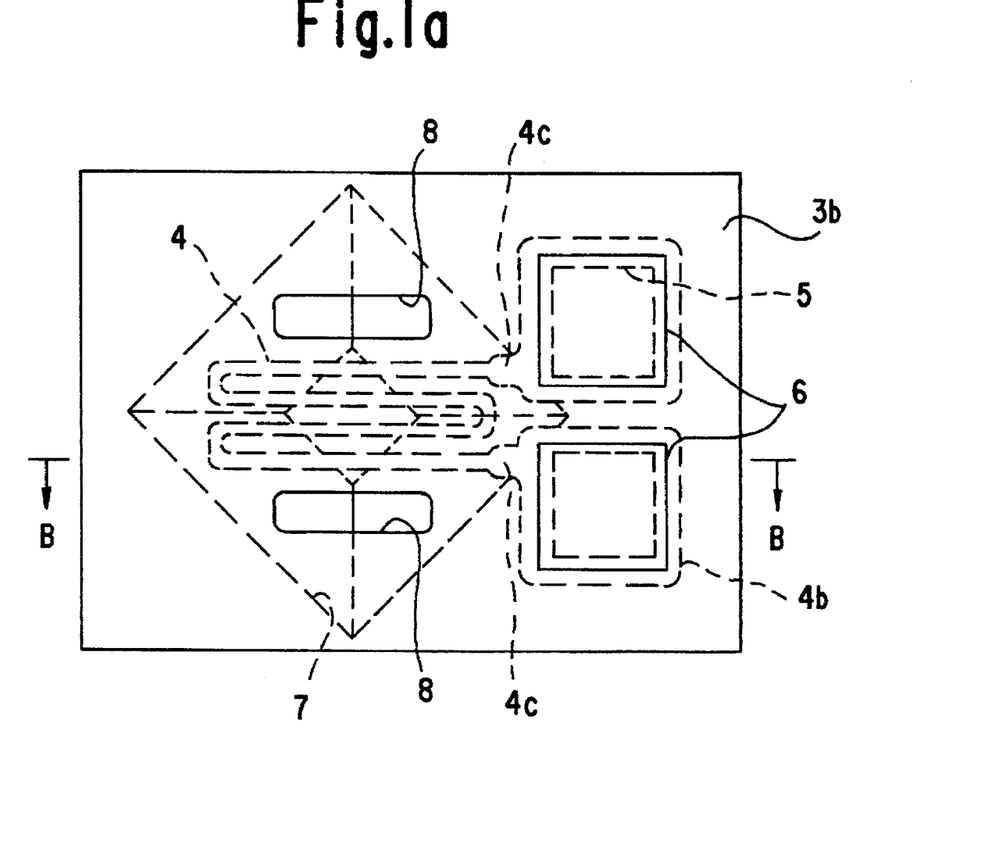
FIG. 1a is a top view of an embodiment of the present invention.
Figure 1B:
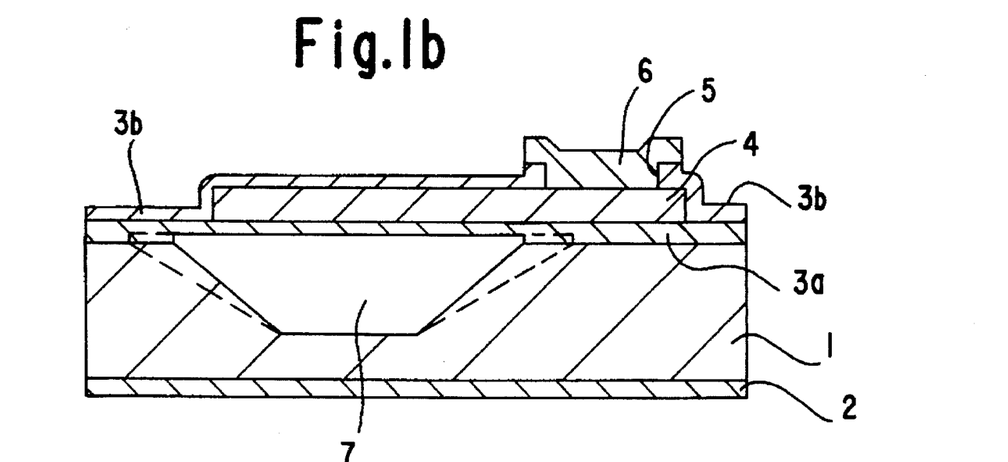

FIG. 1 illustrates an embodiment of a thermal micro flow sensor according to the present invention, wherein FIG. 1a is a top view thereof, and FIG. 1b is a cross-sectional view of the thermal micro flow sensor shown in FIG. 1a taken along line B—B. In FIG. 1a and FIG. 1b, reference numeral 1 denotes a silicon substrate serving as a semiconductor substrate. First, a silicon nitride ($Si_3N_4$) thin film 2 is formed on the lower surface of the silicon substrate 1 so that the silicon nitride thin films 2 serves as a mask during an anisotropic etching process performed later on the silicon substrate 1 so as to form a recess 7 in the silicon substrate 1. A lower protective film 3a made of glass-based material such as silicon dioxide is then formed on the upper surface of the silicon substrate 1 so that the lower protective film 3a not only protects a heating wire 4 but also electrically and thermally isolates the heating wire from the silicon substrate 1. An upper protective film 3b is formed on the upper surface of the heating wire 4 wherein contact holes 5 are formed in the upper protective film 3b so that contact pads 6 are formed via the contact holes 5 in such a manner that the contact pads 6 are in contact with heating wire contacts 4b. The heating wire contacts 4b are connected to the main portion (heating portion) of the heating wire 4 via lead wires 4c. This structure allows the heating wire 4 to be connected to an external electric circuit (not shown). In FIG. 1a, reference numerals 8 denote etching holes formed through both the lower and upper protective films 3a and 3b wherein these etching holes are used later to anisotropically etch the silicon substrate 1 through these holes.

The heating wire for use in a sensor of this type should satisfy further requirements relating to production issues in addition to the above-described basic requirements.

The resistivity of the material for the heating wire used in the thermal micro flow sensor according to the present invention is determined according to the following procedure.

If it is assumed that the heating wire in the form of a bridge or a cantilever beam has a thickness d, width w, and a length l (w<l) then the following conditions relating to production should be satisfied:

1. It is desirable that $0.5 \mu m < d$ to achieve enough self-supporting strength;
2. $d < 2 \mu m$ to enhance the response speed; and
3. $w > 5 \mu m$ for ease in production.

In addition to the above conditions, it is also desirable to satisfy the following conditions relating to basic characteristics of the sensor, which have already been described above:

4. $wl < 20,000 \mu m^2$ to achieve small power consumption;
5. The driving voltage is preferably in the range from 1 to 10 V, and the driving current is preferably in the range from 0.5 mA to 10 mA to achieve a required output level; and
6. The resistance R of the heating wire itself should be in the range $0.5 k\Omega < R < 10 k\Omega$, wherein
7. $R = 1000 \rho l/dw$ ($\rho$ is the resistivity of the heating wire).

To satisfy the above conditions 1–7, the resistivity $\rho$ of the heating wire 4 used in the thermal micro flow sensor of the invention should be in the range from $3.1 \times 10^{-7} \Omega m$ to $2 \times 10^{-2} \Omega m$.

By way of comparison, the resistivities of various metals conventionally used for a heating wire are as follows: Pt has a resistivity of $1.06 \times 10^{-7} \Omega m$, Au $2.4 \times 10^{-8} \Omega m$, W $5.5 \times 10^{-8} \Omega m$, Al $2.7 \times 10^{-8} \Omega m$, and Ni $7.2 \times 10^8 \Omega m$. It is apparent that the resistivity of any of these metals is less than that of polysilicon described above.

Referring now to the processing flow diagram shown in FIG. 2, the process flow for producing the sensor shown in FIG. 1 will be described below.

Figure 2A:
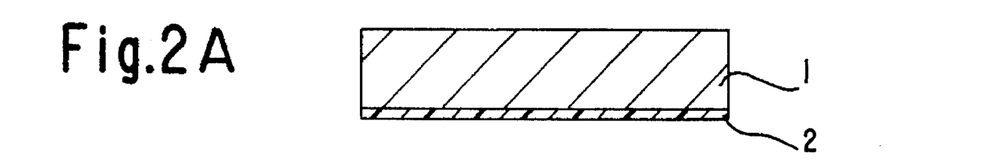

First, as shown in FIG. 2A, a 0.05 μm thick silicon nitride ($Si_3N_4$) film serving as a protective film 2 is deposited on the entire area of the lower surface of a silicon substrate 1 using a plasma CVD technique. This protective film 2 is used later in a process for anisotropically etching the silicon substrate 1 so that the lower surface of the silicon substrate 1 is protected during the etching process. A silicon dioxide film may also be employed as the protective film 2. In this case, however, the film deposition should be performed by means of an atmospheric-pressure CVD technique after the process step F described later so that the resultant silicon dioxide film has a thickness of about 0.2 μm. The protective layer 2 may have a proper thickness in the range from 0.01 μm to 0.5 μm.

Figure 2B:
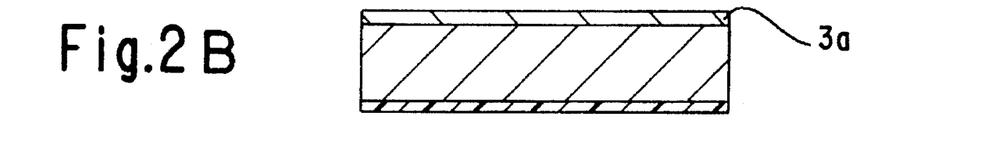

Then, as shown in FIG. 2B, a 0.8 μm thick silicon dioxide ($SiO_2$) film is deposited on the entire area of the upper surface of the silicon substrate 1 using an atmospheric-pressure CVD, sputtering, or thermal oxidation technique so that the deposited silicon dioxide film serves as a lower protective film 3a for protecting a heating wire 4 which will be formed in a succeeding process. This lower protective film 3a electrically and thermally isolates the heating wire 4 from the silicon substrate 1. Whereas a $TEOS-SiO_2$ film is used in this embodiment, any insulating film having a low thermal conductivity may also be employed. The lower protective film 3a may have a proper thickness in the range from 0.1 μm to 2 μm.

Figure 2C:
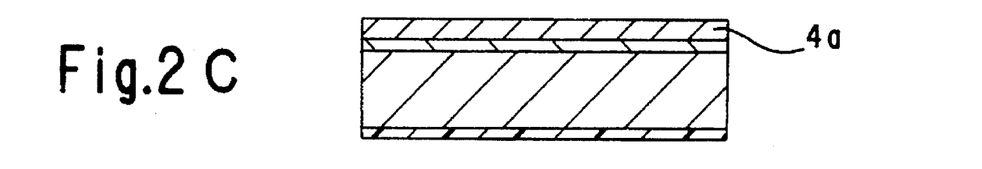

In the following process shown in FIG. 2C, a 1 μm thick polysilicon film 4a which will serve later as the heating wire 4 is deposited on the entire area of the lower protective film 3a by means of CVD such as LPCVD. The polysilicon film 4a is then doped with a proper dopant by means of a combination of ion implantation and diffusion or a combination of dopant coating and diffusion so that the polysilicon film 4a has a desired resistivity. Preferably, the doping is performed using ion implantation in such a manner that the doping level is controlled so that it varies depending of the part of the heating wire. More specifically, the entire area of the polysilicon film 4a is doped in a first ion implantation process, and then portions corresponding to the heating contacts 4b and lead wires 4c are further doped in a second ion implantation process so that these portions have a lower resistivity that of the other portion thereby suppressing undesirable heat generation. Alternatively, the heating contact and lead wire areas 4b and 4c may be ion-implanted first, and then the entire area may be ion-implanted. The polysilicon film 4a may have a proper thickness in the range from 0.5 μm to 2 μm.

Figure 2D:
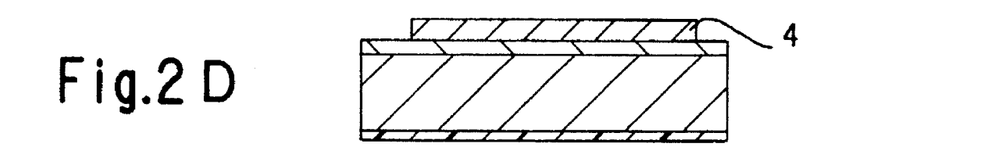

In the next process shown in FIG. 2D, the polysilicon film 4a formed in the preceding process (C) is etched by means of RIE with $SF_6$ gas into a desired form thereby obtaining a heating wire 4 (including heater contacts 4b and lead wires 4c in addition to the main portion).

Figure 2E:
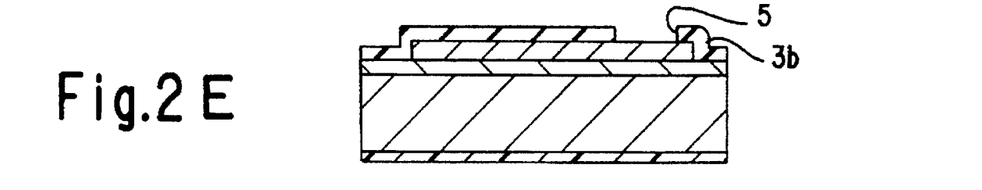

In the process shown in FIG. 2E, after the formation of the heating wire 4 on the lower protective film 3a, a 0.5 μm thick silicon dioxide ($SiO_2$) film serving as the upper protective film 3b is deposited on the entire area of the top surface of the silicon substrate 1 using a CVD or sputtering technique. This upper protective film 3b is used to protect the polysilicon heating wire from an etchant and an atmosphere (air) during an anisotropic etching process performed later. A silicon nitride film may also be employed as the upper protective film 3b. However, the silicon dioxide film is more preferable because the silicon dioxide film is easier than the silicon nitride film to form contact holes 5 in the succeeding etching process without risk of etching the heating wire contacts 4b (refer to FIG. 1a). The upper protective film 3b may have a proper thickness in the range from 0.1 μm to 1.5 μm. Wet etching with a B-HF solution is preferable as an etching technique for forming the contact holes 5 in the upper protective film 3b.

Figure 2F:
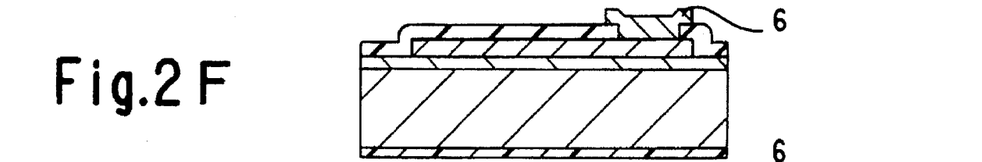

Then, as shown in FIG. 2F, a 0.5 μm thick Au film to be used as the contact pads 6 which will be connected to an external electric circuit (not shown) is deposited on the entire area of the upper surface including the contact holes 5 by means of sputtering or evaporation. The Au film is then etched by means of wet etching with a mixed solution of potassium iodide and iodine so that the Au film is removed except for the areas insides the contact holes 5 and their peripheral areas. The upper and lower protective films 3b and 3a are partially etched by means of RIE with $SF_6$ gas so as to form etching holes in the upper and lower protective films 3b and 3a wherein these etching holes will be used later in an etching process for anisotropically etching the silicon substrate through these etching holes. The contact pads 6 may be formed of any material which can be formed easily, can be etched easily to form etching holes in itself, is not easily etched by an etchant used to anisotropically etch the silicon substrate, and maintains good stability for a long time without encountering a chemical change such as oxidation. Among various materials which are known today, Au is the most preferable. The Au film may have a proper thickness in the range from 0.1 μm to 1 μm.

Before anisotropically etching the silicon substrate 1, the silicon substrate 1 is diced. If the silicon substrate 1 is subjected to the anisotropic etching before it is diced, stress is imposed on the entire silicon substrate, which may destroy the obtained structure. The dicing is performed from the upper surface of the silicon substrate 1 in such a manner that the substrate 1 is not divided into individual chips perfectly but the dicing is stopped so that there are remaining portions having a thickness of 50 to 200 μm.

Figure 2G:
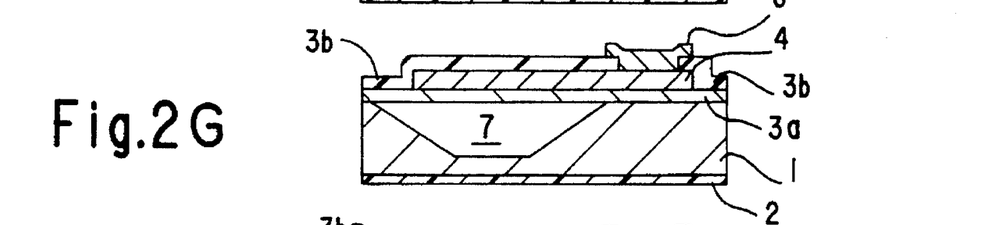

In the process step shown in FIG. 2G, the silicon substrate 1 is exposed to an anisotropic etchant (TMAH or KOH) via the etching holes 5 which have been formed in the previous process step (F) so that a portion under the main part of the heating wire 4 is removed by means of anisotropic etching so as to form an undercut or recessed portion 7 with a depth of about 100 μm, whereby the heating wire 4 is thermally isolated from the silicon substrate 1 by the obtained recessed portion 7. The recessed portion 7 may have a proper depth in the range from 50 μm to 300 μm. Thus, the formation of the heating wire 4 is complete and the main part of the heating wire 4 now has a form of bridge or cantilever beam which is located in a self-supporting fashion above the silicon substrate 1.

The present invention has been described above referring to a single thermal micro flow sensor. In practice, however, a plurality of sensors are produced using a semiconductor fabrication process at a time on a silicon substrate. For example, 144 sensors are formed on a 2-inch wafer.

Figure 2H:
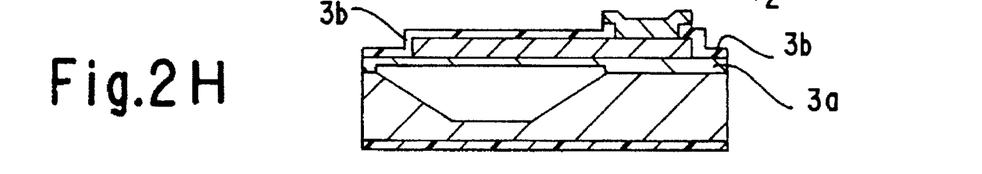

In the final process step shown in FIG. 2H, the upper and lower protective films 3b and 3a covering the heating wire. 4 are thinned by means of etching so as to reduce the thermal capacity of the detecting part including the heating wire 4 thereby improving the sensing responsibility. As a result of the thinning process, the thickness of the upper and lower protective film 3b and 3a becomes 0.1 μm to 0.5 μm except for areas which are in contact with the silicon substrate 1 or the contact pads 6. After the above thinning process, the area of the lower protective film 3b which is in contact with the silicon substrate 1 remains without being thinned. This means that the silicon dioxide ($SiO_2$) film having a small thermal conductivity remains without being thinned, which results in good thermal isolation.

Figure 3:
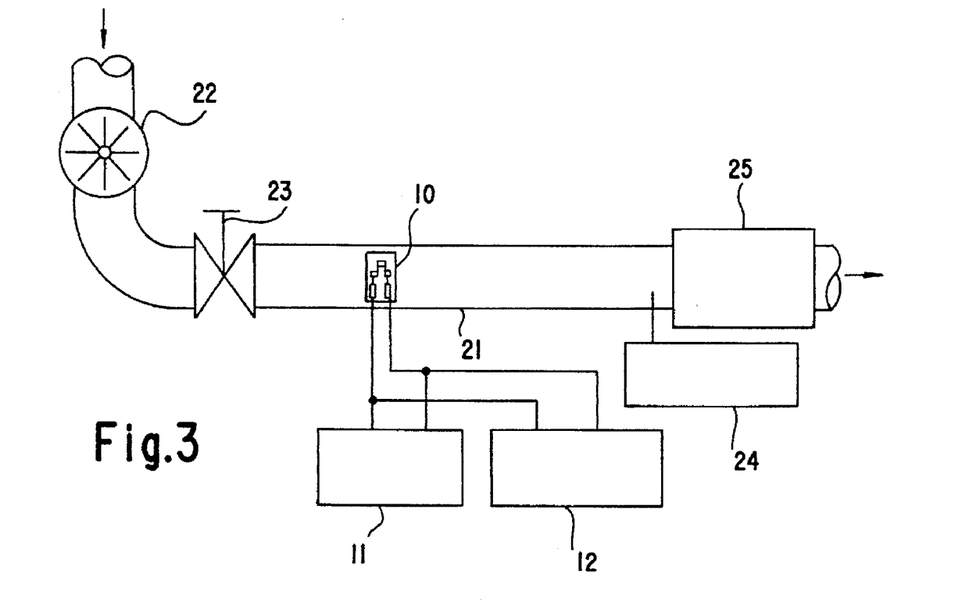
FIG. 3 is a schematic of the experimental setup for the measurement of the flow sensing ability of a thermal flow sensor.
Figure 5:
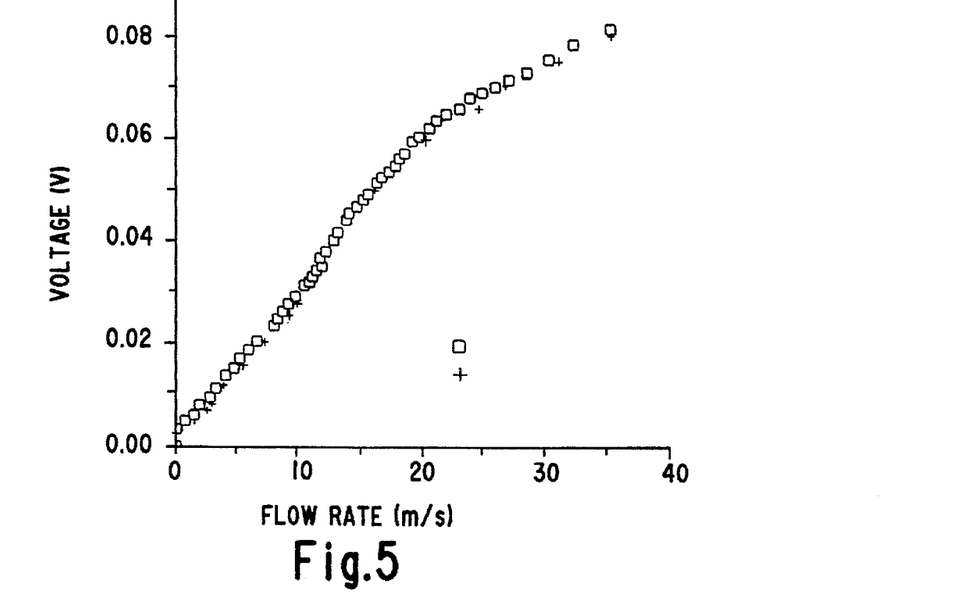
Figure 6:
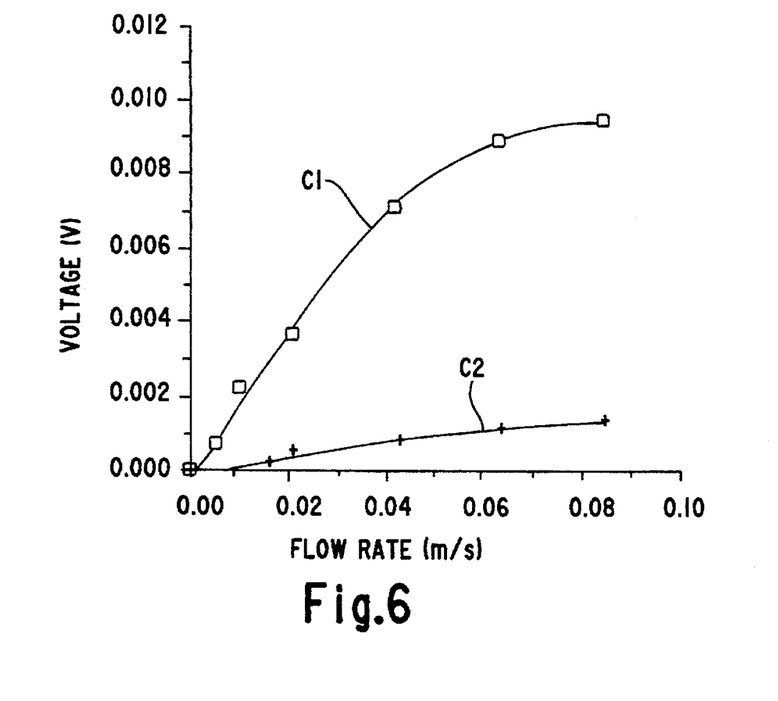

FIGS. 5 and 6 are graphs showing voltage versus flow velocity characteristics of flow sensors according to the present embodiment of the invention, wherein the detection of the flow velocity is performed using a measurement system shown in FIG. 3 in which fluid such as methane gas is supplied from a compressor 22 via a flow regulating valve 23 into a right circular tube 21 having a proper length. A sensor chip 10 including a thermal micro flow sensor according to the present invention is disposed at an approximately central position of the right circular tube 21 in such a manner that the .heating wire 4 is disposed in parallel to the flow of the fluid. The heating wire 4 of the sensor chip 10 is connected to a power supply 11 and a measuring device such as a voltmeter. A pressure gauge 24 and a reference flow meter 25 are disposed at locations which are downstream to the sensor chip 10.

Figure 4:
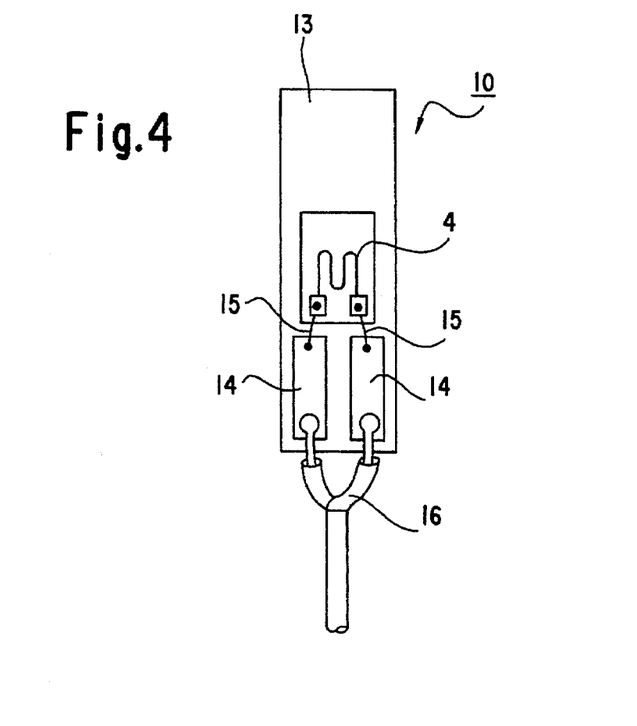
FIG. 4 is a front view of a sensor chip shown in FIG. 1a mounted on a glass plate.

FIG. 4 is an enlarged front view of the sensor chip 10. As shown in FIG. 4, the sensor chip 10 is attached to the upper surface of a glass plate 13. A pair of aluminum interconnections 14, 14 are disposed on an area of one end of the glass plate 13. One end of each aluminum interconnection is connected via a bonding wire 15 to the corresponding contact pad 6 of the thermal micro flow sensor. The other end of each aluminum interconnection is connected via a lead wire 16 to the power supply 11 and measuring device 12 shown in FIG. 3.

The graph of FIG. 5 shows the output voltage as a function of the flow velocity which varies from 0 to 40 m/s wherein the output voltage across the heating wire 4 was measured under the constant current condition (1.5 mA) using the measurement system shown in FIG. 3 with the right circular tube 21 having a diameter of 50 mm and a length of 2000 mm. As can be seen from FIG. 5, the thermal micro flow sensor according to the invention is capable of detecting a large flow velocity up to about 40 m/s. The graph of FIG. 5 shows the results obtained when the measurement was performed twice wherein the flow velocity was varied from low to high values in the first measurement, and from high to low values in the second measurement.

The graph of FIG. 6 shows the output voltage as a function of the flow velocity varying from 0 to 0.1 m/s wherein the output voltage across the heating wire 4 was measured using the measurement system shown in FIG. 3 with the right circular tube 21 having a diameter of 9 mm and a length of 2000 min. The curve C1 represents the characteristic obtained when a current is passed through the heating wire 4 so that the temperature of the heating wire 4 is maintained constant (at about 100° C.). The curve C2 represents the characteristic obtained when the current passing through the heating wire 4 is maintained constant. In either case, the flow sensor can detect the flow velocity up to about 0.01 m/s.

As described above, a single of thermal micro flow sensor according to the present invention has the capability of detecting flow velocity over a very wide range from 0.01 to 40 m/s.

Figure 7:
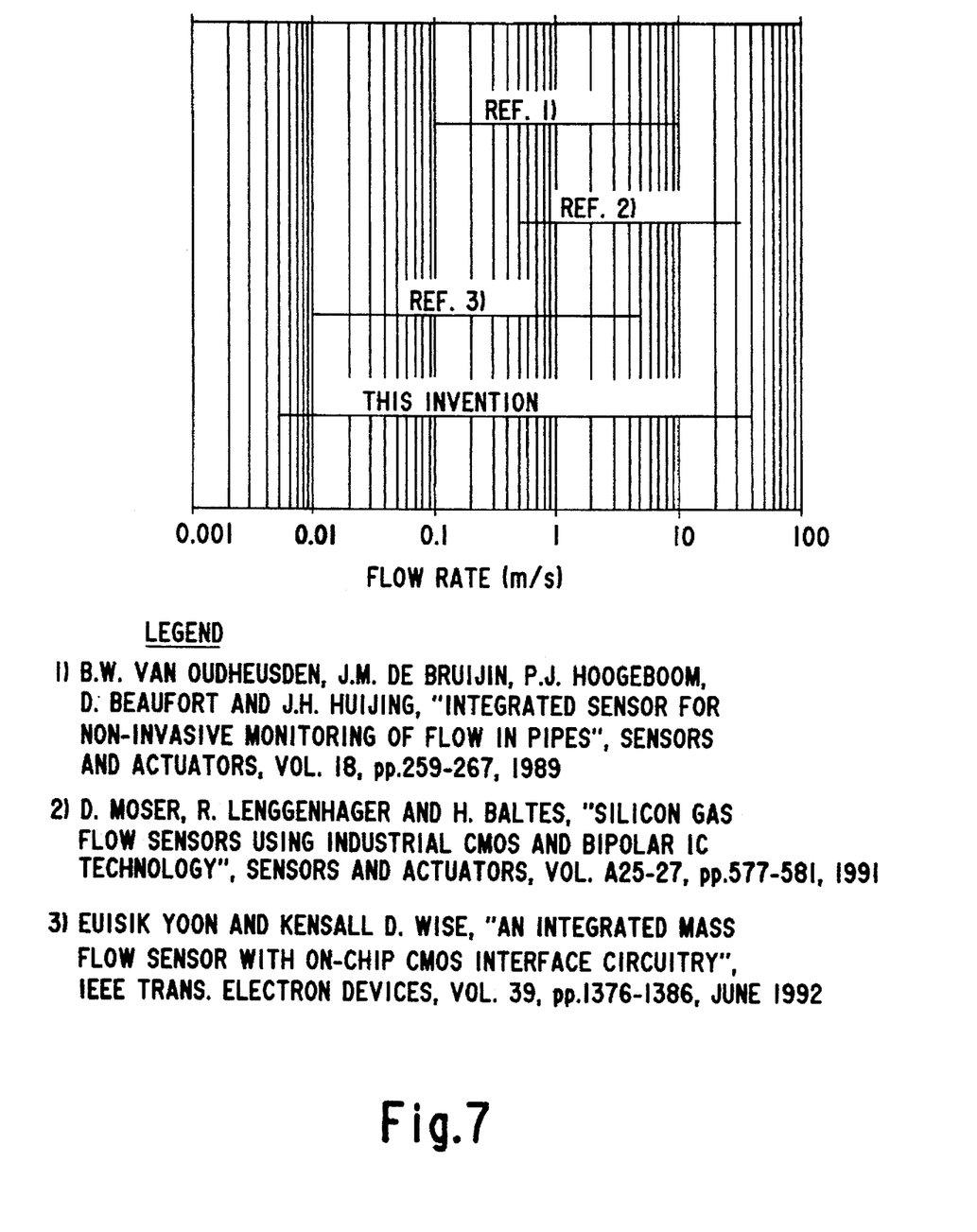
FIG. 7 is a graph which shows the comparison of measurement ranges for various types of flow sensors.

By way of comparison, FIG. 7 shows measurement ranges for various types of flow sensors including conventional ones in addition to the flow sensor according to the present invention. As is apparent from FIG. 7, the thermal micro flow sensor according to the present invention has a very wide measurement range.

Furthermore, the thermal micro flow sensor according to the present invention shows high speed response and the 100%-rising time is as small as 5 msec or less.

The power consumption is as low as 8 mW when power is always supplied so that the temperature of the heating wire is maintained at 100° C. This small power consumption allows the flow sensor to be. powered by a battery.

The thermal micro flow sensor of the present invention has various advantages described below.

1. The heating wire is made of a material having a high resistivity (at least 100 times greater than that of metal) so that the heating wire can have a thickness as large as 0.5 μm to 2 μm while maintaining the resistance of the heating wire at a desired value of about 1 kΩ. This allows the heating wire to have a large thermal capacity per unit contact area, which thus allows the flow sensor to detect a high flow velocity (up to a few ten m/s).

2. Polysilicon is employed as the material of the heating wire. This allows the resistivity of the heating wire to be adjusted by adjusting the doping level. Thus, it is possible to realize various heating wires having various characteristics.

3. The employment of polysilicon as the material of the heating wire ensures that no disconnection failure due to electro-migration or the like occurs even when the flow sensor is used at a very high temperature such as 200° to 300° C. Since the surface of the heating wire is covered with a protective film made of silicon dioxide ($SiO_2$), neither oxidation nor disconnection occurs even when the heating wire is heated in air up to 700°–800° C. so as to remove dust adhering to the heating wire.

4. The heating wire is formed into a very small-sized structure which is thermally isolated from the substrate so that the flow sensor needs power consumption as low as 8 mW or less. This low power consumption allows the flow sensor to operate with a battery power supply.

5. The very small size structure which is thermally isolated from the substrate also allows the flow sensor to respond very quickly (5 msec or more quickly).

6. The thermal micro flow sensor of the invention is produced using semiconductor fabrication technology and thus the mass-production can be achieved easily.

7. A processing circuit such as an amplifier may be formed together with the flow sensor on the same single chip. This allows an improvement in the signal-to-noise ratio of the sensor.

Although the invention has been described above referring to particular embodiments, those with skill in the art will readily recognize that various modifications and changes may be made without departing from the spirit and scope of the invention.

What is claimed is:

1. A thermal micro flow sensor including a heating wire, said heating wire being made of a doped polysilicon having a resistivity in the range from $3.1 \times 10^4$ Ωm to $2 \times 10^4$ Ωm so that said heating wire has a resistance about 1 kΩ, and having a line width in the range of 7 μm to 10 μm and a thickness in the range from 0.5 μm to 2 μm, said heating wire being formed so that the heating wire has a bridge structure or a cantilever structure on a semiconductor substrate by means of semiconductor fabrication technology.

* * * * *